US011946493B2

(12) United States Patent
Takakuwa et al.

(10) Patent No.: US 11,946,493 B2
(45) **Date of Patent: *Apr. 2, 2024**

(54) FLOW RATE CONTROLLER AND DRIVE DEVICE

(71) Applicant: SMC CORPORATION, Chiyoda-ku (JP)

(72) Inventors: Youji Takakuwa, Kitakatsushika-gun (JP); Akihiro Kazama, Moriya (JP); Hiroyuki Asahara, Tsukuba (JP); Kengo Monden, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 21 days.

This patent is subject to a terminal disclaimer.

(21) Appl. No.: 17/640,531

(22) PCT Filed: Aug. 3, 2020

(86) PCT No.: PCT/JP2020/029603

§ 371 (c)(1),
(2) Date: Mar. 4, 2022

(87) PCT Pub. No.: WO2021/044784

PCT Pub. Date: Mar. 11, 2021

(65) Prior Publication Data

US 2022/0333619 A1 Oct. 20, 2022

(30) Foreign Application Priority Data

Sep. 6, 2019 (JP) ................................ 2019-162912

(51) Int. Cl.

| | |
|---|---|
| ***F15B 11/068*** | (2006.01) |
| ***F15B 11/04*** | (2006.01) |
| ***F15B 13/02*** | (2006.01) |

(52) U.S. Cl.
CPC ........ *F15B 11/068* (2013.01); *F15B 11/0413* (2013.01); *F15B 13/027* (2013.01);
(Continued)

(58) Field of Classification Search
CPC .... F15B 2211/8855; F15B 2211/40584; F15B 2211/40592; F15B 2211/755;
(Continued)

(56) References Cited

U.S. PATENT DOCUMENTS 3,430,540 A * 3/1969 Peter ..................... F15B 11/044 91/454
6,131,610 A * 10/2000 Morisako ................ F15B 13/01 91/443
6,745,789 B2 * 6/2004 Christiani ........... F15B 11/0413 91/420

FOREIGN PATENT DOCUMENTS

JP 52-21399 U1 2/1977
JP 2009-115242 A 5/2009
(Continued)

OTHER PUBLICATIONS

International Search Report dated Oct. 13, 2020 in PCT/JP2020/029603 filed Aug. 3, 2020, 2 pages.

*Primary Examiner* — Kenneth Bomberg
*Assistant Examiner* — Michael Quandt
(74) *Attorney, Agent, or Firm* — Oblon, McClelland, Maier & Neustadt, L.L.P.

(57) ABSTRACT

A flow rate controller and a drive device are provided with a first flow passage connected between an operation switching valve and an air cylinder, and that supplies air to and discharges air from a cylinder chamber of the air cylinder; a first flow rate adjustment part provided in the first flow passage; a second flow passage adjacent to the first flow passage; a pilot check valve provided at a point along the second flow passage; a second flow rate adjustment part
(Continued)

connected in series to the pilot check valve at a point along the second flow passage; a pilot air flow passage, one end of which communicates with the operation switching valve and the other end of which is connected to a pilot port of the pilot check valve; and a third flow rate adjustment part provided in the pilot air flow passage.

5 Claims, 3 Drawing Sheets

(52) U.S. Cl.
CPC ............... *F15B 2211/30505* (2013.01); *F15B 2211/40515* (2013.01); *F15B 2211/40584* (2013.01); *F15B 2211/40592* (2013.01); *F15B 2211/7053* (2013.01); *F15B 2211/75* (2013.01); *F15B 2211/8855* (2013.01)

(58) Field of Classification Search
CPC ... F15B 2211/46; F15B 2211/75; F15B 11/06; F15B 11/064; F15B 15/22; F15B 15/204
See application file for complete search history.

(56) References Cited

FOREIGN PATENT DOCUMENTS

| | | | |
|---|---|---|---|
| JP | 2014-129853 | A | 7/2014 |
| JP | 5578502 | B2 | 8/2014 |

* cited by examiner

FLOW RATE CONTROLLER AND DRIVE DEVICE

TECHNICAL FIELD

The present invention relates to a flow rate controller for adjusting an operating speed of an air cylinder, and to a drive device.

BACKGROUND ART

Conventionally, a shock absorbing mechanism has been used in which a cushioning material made of a soft resin such as rubber or urethane or the like, or an oil damper or the like is attached to an end part of an air cylinder, to thereby cushion an impact at a stroke end. However, such a shock absorbing mechanism that mechanically mitigates shocks in the cylinder is limited in terms of the number of operations it can perform, and requires regular maintenance.

In order to resolve such incompatibility, in JP 5578502 B2, a speed controller (flow rate controller) is disclosed in which, by throttling the exhaust air that is discharged from the air cylinder in the vicinity of a stroke end, an operating speed of the air cylinder is reduced.

SUMMARY OF THE INVENTION

However, a problem arises in that such a conventional flow rate controller is formed with a large number of component parts, and the device configuration thereof becomes complicated.

The present invention has the object of providing a flow rate controller and a drive device which, with a simple device configuration, are capable of mitigating shocks in an air cylinder.

One aspect of the present invention is characterized by a flow rate controller, comprising a first flow path connected between an operation switching valve and an air cylinder, and configured to supply and discharge air to and from a cylinder chamber of the air cylinder, a first flow rate adjustment part disposed in the first flow path, a second flow path disposed in parallel with the first flow path, a pilot check valve disposed midway along the second flow path, and including an inlet port, an outlet port, and a pilot port, the inlet port being connected to a first portion of the second flow path on a side of the operation switching valve, and the outlet port being connected to a second portion of the second flow path on a side of the air cylinder, a second flow rate adjustment part disposed midway along the second flow path, and connected in series with the pilot check valve, a pilot air flow path one end of which communicates with the operation switching valve, and another end of which is connected to the pilot port of the pilot check valve, and a third flow rate adjustment part disposed in the pilot air flow path.

Another aspect of the present invention is characterized by a drive device, comprising a high pressure air supply source configured to supply high pressure air to an air cylinder, an exhaust port configured to discharge exhaust air from the air cylinder, an operation switching valve configured to switch and connect one of the high pressure air supply source or the exhaust port to a port of the air cylinder, and a flow rate controller disposed between the operation switching valve and the port of the air cylinder, wherein the flow rate controller includes a first flow path connected between the operation switching valve and the air cylinder, and configured to supply and discharge air to and from a cylinder chamber of the air cylinder, a first flow rate adjustment part disposed in the first flow path, a second flow path disposed in parallel with the first flow path, a pilot check valve disposed midway along the second flow path, and including an inlet port, an outlet port, and a pilot port, the inlet port being connected to a first portion of the second flow path on a side of the operation switching valve, and the outlet port being connected to a second portion of the second flow path on a side of the air cylinder, a second flow rate adjustment part disposed midway along the second flow path, and connected in series with the pilot check valve, a pilot air flow path one end of which communicates with the operation switching valve, and another end of which is connected to the pilot port of the pilot check valve, and a third flow rate adjustment part disposed in the pilot air flow path.

In accordance with the flow rate controller and the drive device according to the above-described aspects, it is possible to mitigate shocks in the air cylinder with a simple device configuration.

DESCRIPTION OF THE INVENTION

Hereinafter, a preferred embodiment of the present invention will be presented and described in detail below with reference to the accompanying drawings.

Figure 1:
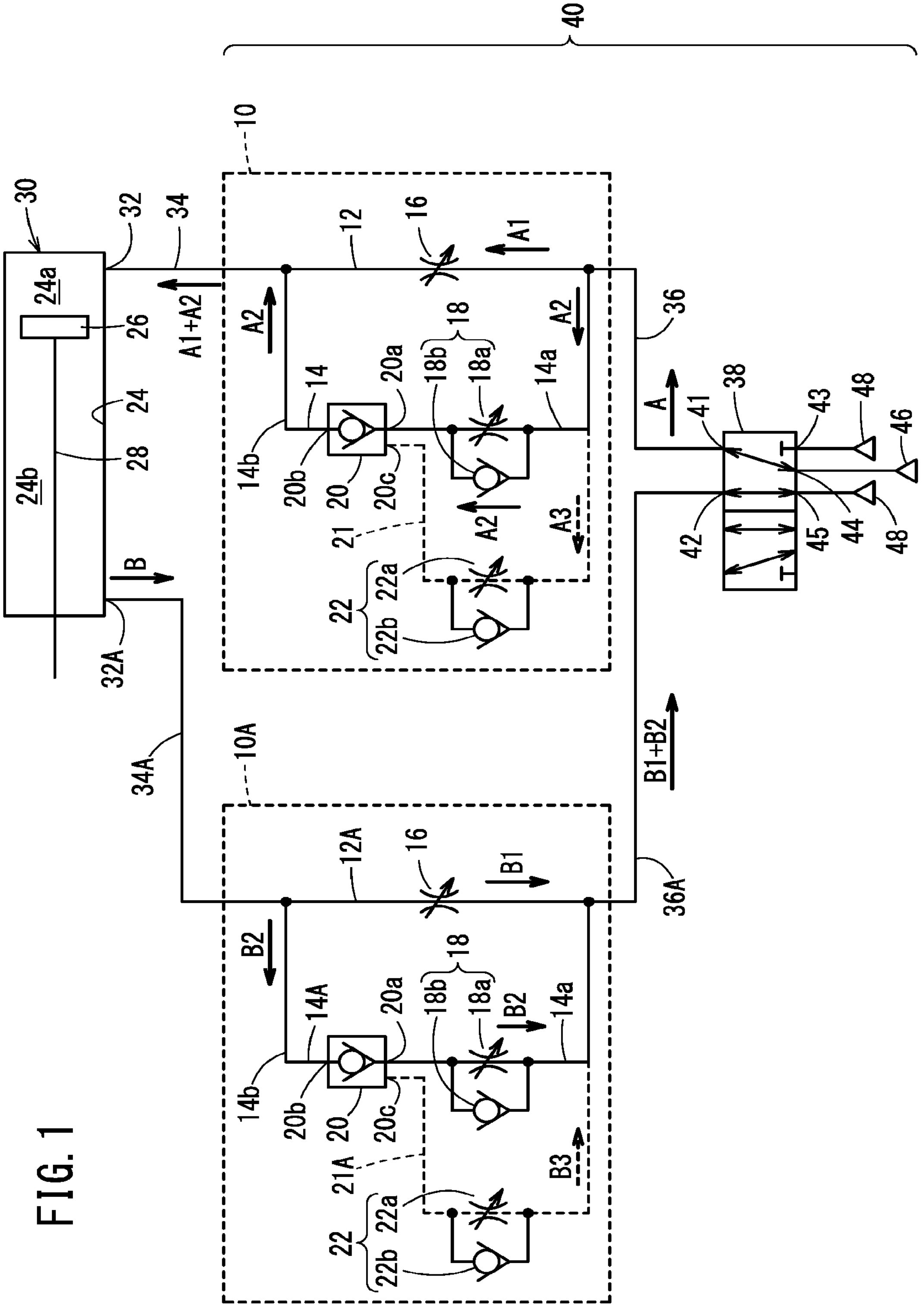
FIG. 1 is a fluid circuit diagram of a flow rate controller and a drive device for an air cylinder according to an embodiment of the present invention.

An air cylinder 30 shown in FIG. 1 is a double acting cylinder that is used in an automated equipment line or the like, and is driven by a drive device 40 equipped with a pair of flow rate controllers 10 and 10A, an operation switching valve 38, a high pressure air supply source 46, and exhaust ports 48.

The air cylinder 30 comprises a piston 26 that partitions a cylinder chamber 24, and a piston rod 28 connected to the piston 26. The cylinder chamber 24 is partitioned by the piston 26 into a head side pressure chamber **24*a* and a rod side pressure chamber 24*b*. A head side port 32 is provided in the head side pressure chamber 24*a*, and a rod side port 32A is provided in the rod side pressure chamber 24*b***.

A head side first flow path 12 and a head side second flow path 14 are connected to the head side port 32, and a rod side first flow path 12A and a rod side second flow path 14A are connected to the rod side port 32A. The operation switching valve 38, which switches and connects the high pressure air supply source 46 and the exhaust port 48, is connected to these flow paths. In addition, supplying of the high pressure air to the air cylinder 30, and discharging of the exhaust air from the air cylinder 30 are carried out through the first flow path 12 or 12A and the second flow path 14 or 14A.

The head side flow rate controller 10 includes the head side first flow path 12 and the head side second flow path 14. The first flow path 12 and the second flow path 14 are connected in parallel. As shown in the illustrated example, one end of the first flow path 12 and one end of the second flow path 14 are collectively coupled with a pipe 34 and connected to the head side port 32, and the other end of the first flow path 12 and the other end of the second flow path 14 are collectively coupled with a pipe 36 and connected to the operation switching valve 38.

A first flow rate adjustment part 16 is provided in the first flow path 12. The first flow rate adjustment part 16 is a throttle valve, and is capable of variably adjusting the flow rate of the air that passes through the first flow path 12. On the other hand, a pilot check valve 20, and a second flow rate adjustment part 18 are provided in the second flow path 14.

The pilot check valve 20 includes an inlet port 20*a*, an outlet port 20*b*, and a pilot port 20*c*. The inlet port 20*a* is connected to a first portion 14*a* of the second flow path 14 on the operation switching valve 38 side, the outlet port 20*b* is connected to a second portion 14*b* of the second flow path 14 on the air cylinder 30 side, and the pilot port 20*c* is connected to a later-described pilot air flow path 21. In the case that the pressure of the pilot air is less than a predetermined value, the pilot check valve 20 allows passage of the air flowing from the inlet port 20*a* toward the outlet port 20*b*, and prevents the air from flowing in a direction opposite thereto. Further, when the pressure of the pilot air becomes greater than or equal to the predetermined value, the pilot check valve 20 allows passage of the air flowing from the inlet port 20*a* toward the outlet port 20*b*, and allows passage of the air flowing in a direction opposite thereto.

The second flow rate adjustment part 18 is connected in series with the pilot check valve 20. In the illustrated example, although being connected to the first portion 14*a* of the second flow path 14 (on the operation switching valve 38 side of the pilot check valve 20), the present invention is not limited to this feature, and the second flow rate adjustment part 18 may be connected to the second portion 14*b* of the second flow path 14 (on the air cylinder 30 side of the pilot check valve 20). The second flow rate adjustment part 18 includes a second throttle valve 18*a*, and a check valve 18*b* which is disposed in parallel with the second throttle valve 18*a*. The check valve 18*b* is connected in a direction that allows passage of the air flowing toward the air cylinder 30 side, and prevents the air from flowing in a direction opposite thereto. The air flowing toward the operation switching valve 38 is capable of being variably adjusted by the second throttle valve 18*a*. The second flow rate adjustment part 18 may be configured in the form of a check valve equipped throttle valve in which the second throttle valve 18*a* and the check valve 18*b* are integrated.

Further, the head side flow rate controller 10 is further equipped with the pilot air flow path 21 that carries out supply and discharge of the pilot air of the pilot check valve 20, and a third flow rate adjustment part 22. One end part of the pilot air flow path 21 communicates with the operation switching valve 38, and the other end part thereof is connected to the pilot port 20*c* of the pilot check valve 20. The third flow rate adjustment part 22 is disposed midway along the pilot air flow path 21, and is equipped with a third throttle valve 22*a*, and a check valve 22*b* which is disposed in parallel with the third throttle valve 22*a*. The check valve 22*b* is connected in a direction that allows passage of the air flowing toward the pilot check valve 20 side, and prevents the air from flowing in a direction opposite thereto. The third throttle valve 22*a* is capable of variably adjusting the flow rate of the pilot air discharged from the pilot check valve 20. The third flow rate adjustment part 22 may be configured in the form of a check valve equipped throttle valve in which the third throttle valve 22*a* and the check valve 22*b* are integrated.

While the head side flow rate controller 10 is configured in the manner described above, the rod side flow rate controller 10A is arranged in a pipeline between the rod side port 32A and the operation switching valve 38. Since the rod side flow rate controller 10A is configured in substantially the same manner as the head side flow rate controller 10, constituent elements thereof which are the same as the constituent elements of the head side flow rate controller 10 are designated by the same reference numerals, and detailed description thereof is omitted. However, with respect to the first flow path 12, the second flow path 14, and the pilot air flow path 21 of the head side flow rate controller 10, the letter A is appended to the end of each of the reference numerals for the rod side flow rate controller 10A, and is shown in order to distinguish them from each other.

Next, a description will be given concerning the configuration of the operation switching valve 38 that is connected to the head side and the rod side flow rate controllers 10 and 10A. The operation switching valve 38 is a 5-port valve that electrically switches between the flow paths of the high pressure air, and includes first through fifth ports 41 to 45. The first port 41 is connected to the first flow path 12 and the second flow path 14 of the head side flow rate controller 10. The second port 42 is connected to the first flow path 12A and the second flow path 14A of the rod side flow rate controller 10A. The third port 43 and the fifth port 45 are connected to the exhaust ports 48. The fourth port 44 is connected to the high pressure air supply source 46 that supplies the high pressure air.

Figure 2:
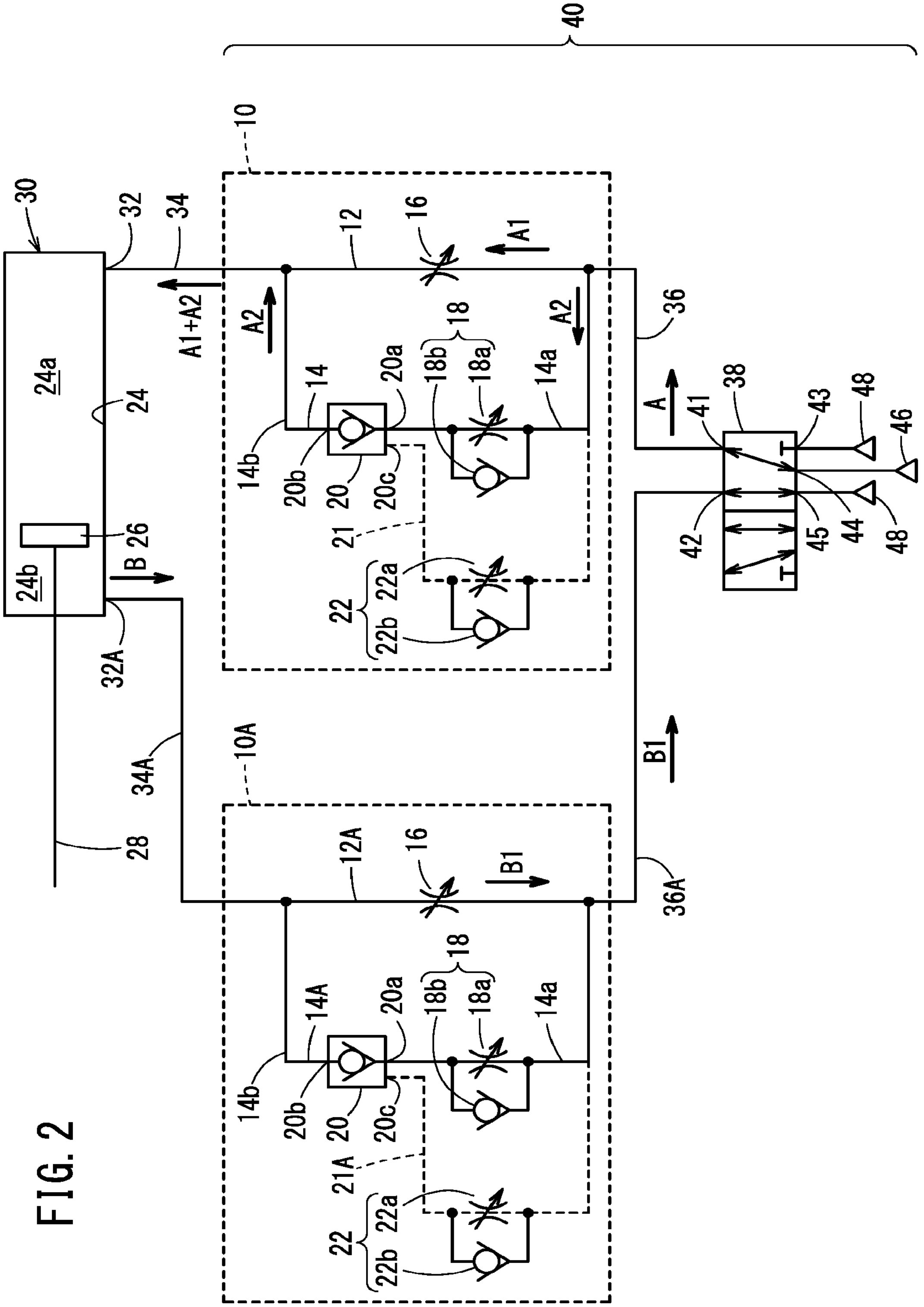
FIG. 2 is a fluid circuit diagram showing, in the flow rate controller and the drive device shown in FIG. 1, a state in which a rod side flow rate controller is switched to a second control flow in an operating stroke.

At a first position shown in FIGS. 1 and 2, the operation switching valve 38 allows the first port 41 and the fourth port 44 to communicate with each other, and allows the second port 42 and the fifth port 45 to communicate with each other. More specifically, at the first position, the operation switching valve 38 connects the high pressure air supply source 46 to the head side flow rate controller 10, and connects the exhaust port 48 to the rod side flow rate controller 10A, thereby causing the air cylinder 30 to carry out an operating stroke.

Figure 3:
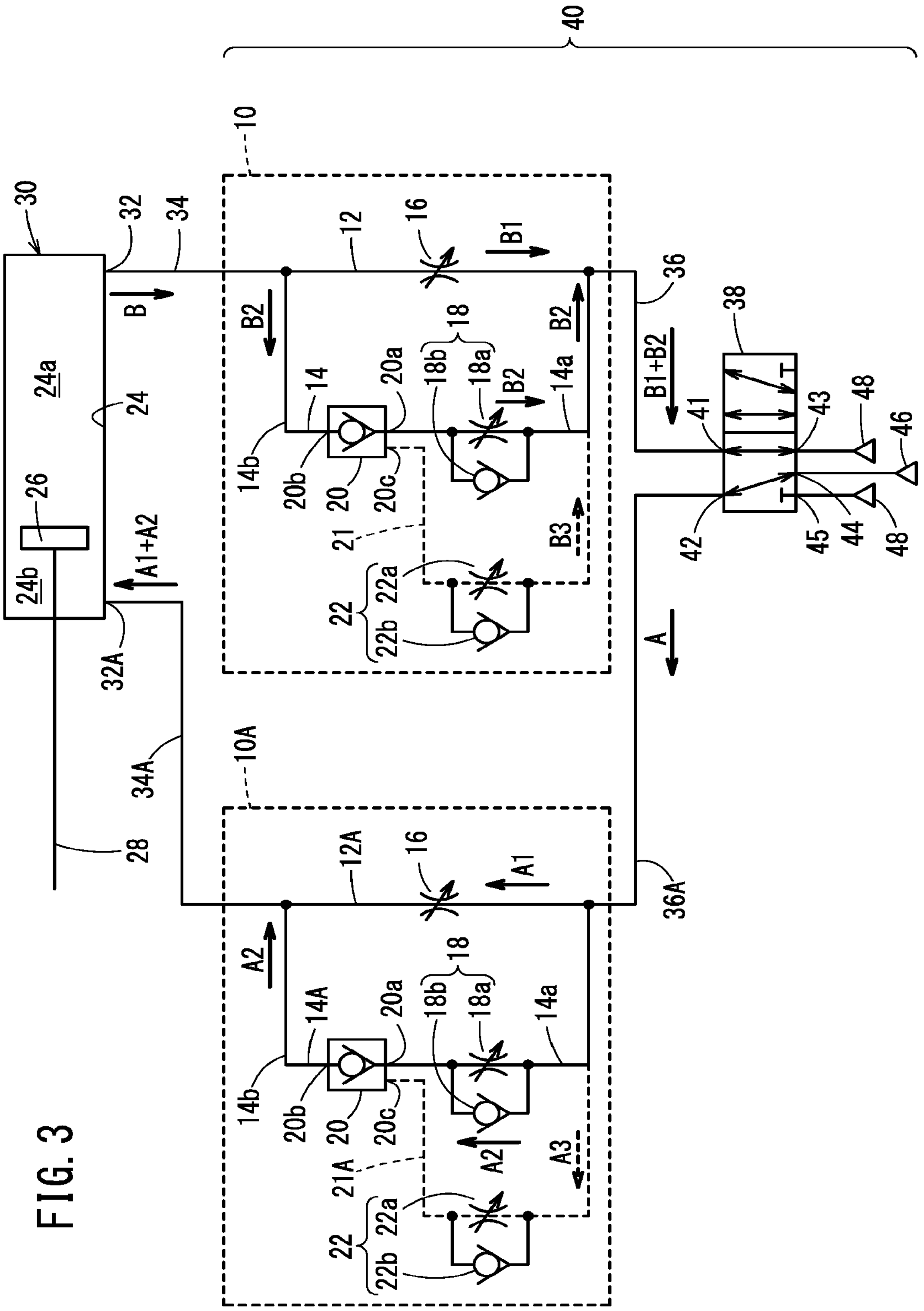
FIG. 3 is a fluid circuit diagram showing, in the flow rate controller and the drive device shown in FIG. 1, a connected relationship in a return stroke.

Further, at a second position shown in FIG. 3, the operation switching valve 38 allows the first port 41 and the third port 43 to communicate with each other, and allows the second port 42 and the fourth port 44 to communicate with each other. More specifically, at the second position, the operation switching valve 38 connects the head side flow rate controller 10 to the exhaust port 48, and connects the rod side flow rate controller 10A to the high pressure air supply source 46, thereby causing the air cylinder 30 to carry out a return stroke.

The flow rate controllers 10 and 10A and the drive device 40 of the present embodiment are configured in the manner described above. Hereinafter, a description will be given concerning the operations thereof.

As shown in FIG. 1, in the operating stroke, the fourth port 44 and the first port 41 of the operation switching valve 38 are allowed to communicate with each other, and the high pressure air of the high pressure air supply source 46 is supplied to the head side flow rate controller 10. The high pressure air, as shown by the arrow A, flows through the pipe 36 toward the air cylinder 30. Then, the high pressure air branches into high pressure air A1 flowing through the first flow path 12, and high pressure air A2 flowing through the second flow path 14.

The high pressure air A1 in the first flow path 12 flows at a predetermined flow rate which is throttled by the first flow rate adjustment part 16. On the other hand, the high pressure air A2 in the second flow path 14 is directed toward the second flow rate adjustment part 18. Since the check valve 18*b* of the second flow rate adjustment part 18 is connected in a direction that allows passage of the high pressure air A2, the high pressure air A2 primarily passes through the check valve 18*b* and is directed toward the pilot check valve 20. Since the pilot check valve 20 is connected in a direction that allows passage of the high pressure air A2, the high pressure air A2 passes through the pilot check valve 20, and flows toward the air cylinder 30. In this way, the high pressure air A2 flows in a free flowing manner through the second flow path 14 without being subjected to throttling by the throttle valve.

Then, the high pressure air A1 from the first flow path 12 and the high pressure air A2 from the second flow path 14 flow into the head side pressure chamber 24*a* of the air cylinder 30, and the piston 26 is driven toward the rod side.

Further, in the operating stroke, a portion of the high pressure air flows as pilot air into the pilot air flow path 21 as shown by the arrow A3. The check valve 22*b* of the third flow rate adjustment part 22 rapidly causes the pilot air flowing toward the pilot check valve 20 to pass, and supplies the pilot air to the pilot check valve 20. Consequently, the pressure of the pilot air of the pilot check valve 20 becomes a high value.

On the other hand, the exhaust air is discharged from the rod side pressure chamber 24*b* of the air cylinder 30 through the rod side port 32A. The exhaust air flows through a pipe 34A as shown by the arrow B, and flows into the rod side flow rate controller 10A. In the flow rate controller 10A, the exhaust air flows into the first flow path 12A and the second flow path 14A. Exhaust air B1 that has flowed into the first flow path 12A flows at a predetermined flow rate which is throttled by the first flow rate adjustment part 16.

Further, exhaust air B2 that has flowed into the second flow path 14A flows into the pilot check valve 20. The pilot air that was accumulated therein during the previous return stroke remains in the pilot check valve 20, and the pressure of the pilot air of the pilot check valve 20 is maintained at a value that is higher than the predetermined value until midway in the operating stroke. Therefore, the pilot check valve 20 allows the exhaust air B2 to pass until midway in the operating stroke. The exhaust air B2 that has passed through the pilot check valve 20 flows through the second flow path 14A at a predetermined flow rate which is throttled by the second throttle valve 18*a* of the second flow rate adjustment part 18. In this manner, the rod side flow rate controller 10A allows the exhaust air B1+B2 to pass therethrough at a flow rate corresponding to the sum of the flow rate of the exhaust air B1 passing through the first flow rate adjustment part 16 and the flow rate of the exhaust air B2 passing through the second flow rate adjustment part 18.

The exhaust air of the air cylinder 30 is discharged in a first control flow at a flow rate that is the sum of the flow rates of the first flow rate adjustment part 16 and the second flow rate adjustment part 18, and the piston 26 moves to the rod side at a speed that is regulated by the first control flow.

While the operating stroke is being performed, the pilot air of the pilot check valve 20 is discharged through a pilot air flow path 21A of the rod side flow rate controller 10A. Discharging of the pilot air is gradually performed through the third throttle valve 22*a* of the third flow rate adjustment part 22, whereby the pressure of the pilot air decreases.

As shown in FIG. 2, at a timing when the piston 26 of the air cylinder 30 reaches the vicinity of the stroke end, the pressure of the pilot air of the pilot check valve 20 on the rod side falls below the predetermined value, and the pilot check valve 20 on the rod side blocks the second flow path 14A and prevents passage of the exhaust air B2.

Accompanying blockage of the second flow path 14A by the pilot check valve 20, only the exhaust air B1 flowing through the first flow rate adjustment part 16 is discharged from the air cylinder 30. The exhaust air of the air cylinder 30 is switched to a second control flow which is throttled by the first flow rate adjustment part 16. Since the second control flow is more strongly throttled than the first control flow, the operating speed of the piston 26 of the air cylinder 30 is reduced. Consequently, the speed of the piston 26 is reduced, and shocks in the vicinity of the stroke end of the piston 26 are mitigated.

Thereafter, as shown in FIG. 3, the operation switching valve 38 is switched to the second position, whereby the head side flow rate controller 10 is connected to the exhaust port 48, and the rod side flow rate controller 10A is connected to the high pressure air supply source 46. Then, the high pressure air is introduced through the flow rate controller 10A into the rod side pressure chamber 24*b* of the air cylinder 30, and the exhaust air of the head side pressure chamber 24*a* is discharged through the head side flow rate controller 10. Consequently, the return stroke in which the piston 26 moves to the head side is initiated.

It should be noted that, since the operations of the head side flow rate controller 10 in the return stroke are the same as those of the rod side flow rate controller 10A in the operating stroke, and the operations of the rod side flow rate controller 10A in the return stroke are the same as those of the head side flow rate controller 10 in the operating stroke, a detailed description of such operations will be omitted herein. In the return stroke, in the head side flow rate controller 10, the exhaust air is switched from the first control flow that passes through the first flow rate adjustment part 16 and the second flow rate adjustment part 18, to the second control flow that flows only through the first flow rate adjustment part 16, and shocks at the stroke end of the piston 26 are mitigated.

The flow rate controllers 10 and 10A and the drive device 40 of the present embodiment realize the following advantageous effects.

The flow rate controller 10 or 10A according to the present invention comprises the first flow path 12 or 12A that is connected between the operation switching valve 38 and the air cylinder 30, and that supplies and discharges air to and from the cylinder chamber 24 of the air cylinder 30, the first flow rate adjustment part 16 disposed in the first flow path 12 or 12A, the second flow path 14 or 14A disposed in parallel with the first flow path 12 or 12A, the pilot check valve 20 disposed midway along the second flow path 14 or 14A, and including the inlet port 20*a*, the outlet port 20*b*, and the pilot port 20*c*, the inlet port 20*a* being connected to the first portion 14*a* of the second flow path 14 or 14A on the operation switching valve 38 side, and the outlet port 20*b* being connected to the second portion 14*b* of the second flow path 14 or 14A on the air cylinder 30 side, the second flow rate adjustment part 18 disposed midway along the second flow path 14 or 14A, and connected in series with the pilot check valve 20, the pilot air flow path 21 or 21A one end of which communicates with the operation switching valve 38, and the other end of which is connected to the pilot port 20*c* of the pilot check valve 20, and the third flow rate adjustment part 22 disposed in the pilot air flow path 21 or 21A.

In accordance with the above-described configuration, without the use of component parts having a complicated structure such as a shuttle valve and a spool valve, it is possible for the flow rate controller 10 or 10A, which is capable of mitigating shocks in the vicinity of a stroke end, to be realized with a simple device configuration.

In the above-described flow rate controller 10 or 10A, when a pressure of the pilot air is less than a predetermined value, the pilot check valve 20 may prevent the air from flowing from the outlet port 20*b* toward the inlet port 20*a*, and when the pressure of the pilot air is greater than or equal to the predetermined value, the pilot check valve 20 may allow passage of the air flowing from the outlet port 20*b* toward the inlet port 20*a*.

In the above-described flow rate controller 10 or 10A, the third flow rate adjustment part 22 may be equipped with the third throttle valve 22*a*, and the check valve 22*b* that is disposed in parallel with the third throttle valve 22*a*, that allows passage of the air flowing in a direction toward the pilot port 20*c*, and that prevents the air from flowing in a direction opposite thereto. The check valve 22*b* can rapidly supply the pilot air to the pilot check valve 20 when the high pressure air is supplied. Further, since the discharge speed of the pilot air can be variably adjusted by the third throttle valve 22*a*, it is possible to easily carry out adjustment of the timing for the flow rate controller 10 or 10A at which the first control flow is switched to the second control flow.

In the above-described flow rate controller 10 or 10A, the second flow rate adjustment part 18 may be equipped with the second throttle valve 18*a*, and the check valve 18*b* that is disposed in parallel with the second throttle valve 18*a*, that allows passage of the air flowing in a direction toward the air cylinder 30, and that prevents the air from flowing in a direction opposite thereto. With the above-described configuration, the flow rate of the first control flow can be variably adjusted by the second throttle valve 18*a*. Further, since the high pressure air can be supplied in a free flowing manner to the air cylinder 30 by the check valve 18*b*, the air cylinder 30 is made capable of being suitably operated at a high speed.

The drive device 40 according to the present invention is characterized by the drive device 40 comprising the high pressure air supply source 46 that supplies the high pressure air to the air cylinder 30, the exhaust port 48 through which the exhaust air from the air cylinder 30 is discharged, the operation switching valve 38 which switches and connects one of the high pressure air supply source 46 or the exhaust port 48 to the port of the air cylinder 30, and the flow rate controller 10 or 10A disposed between the operation switching valve 38 and the port of the air cylinder 30, wherein the flow rate controller 10 or 10A includes the first flow path 12 or 12A that is connected between the operation switching valve 38 and the air cylinder 30, and that supplies and discharges air to and from the cylinder chamber 24 of the air cylinder 30, the first flow rate adjustment part 16 disposed in the first flow path 12 or 12A, the second flow path 14 or 14A disposed in parallel with the first flow path 12 or 12A, the pilot check valve 20 disposed midway along the second flow path 14 or 14A, and including the inlet port 20*a*, the outlet port 20*b*, and the pilot port 20*c*, the inlet port 20*a* being connected to the first portion 14*a* of the second flow path 14 or 14A on the operation switching valve 38 side, and the outlet port 20*b* being connected to the second portion 14*b* of the second flow path 14 or 14A on the air cylinder 30 side, the second flow rate adjustment part 18 disposed midway along the second flow path 14 or 14A, and connected in series with the pilot check valve 20, the pilot air flow path 21 or 21A one end of which communicates with the operation switching valve 38, and the other end of which is connected to the pilot port 20*c* of the pilot check valve 20, and the third flow rate adjustment part 22 disposed in the pilot air flow path 21 or 21A.

In accordance with the above-described configuration, with a simple device configuration, it is possible for the drive device 40, which is capable of mitigating shocks in the vicinity of a stroke end, to be realized.

Although a description of a preferred embodiment of the present invention has been presented above, it should be understood that the present invention is not limited to the above-described embodiment, but various changes and modifications may be made within a range that does not deviate from the essence and gist of the present invention.

The invention claimed is:

1. A flow rate controller, comprising:

a first flow path connected between an operation switching valve and an air cylinder, and configured to supply and discharge air to and from a cylinder chamber of the air cylinder;

a first flow rate control valve disposed in the first flow path;

a second flow path disposed in parallel with the first flow path;

a pilot check valve disposed midway along the second flow path, and including an inlet port, an outlet port, and a pilot port, the inlet port being connected to a first portion of the second flow path on a side of the operation switching valve, and the outlet port being connected to a second portion of the second flow path on a side of the air cylinder;

a second flow rate control valve disposed midway along the second flow path, and connected in series with the pilot check valve;

a pilot air flow path one end of which communicates with the first flow path between the first flow rate control valve and the operation switching valve and with the second flow path between the second flow rate control valve and the operation switching valve, and another end of which is connected to the pilot port of the pilot check valve; and a third flow rate control valve disposed in the pilot air flow path.

2. The flow rate controller according to claim 1, wherein:

when a pressure of pilot air is less than a predetermined value, the pilot check valve prevents the air from flowing from the outlet port toward the inlet port; and when the pressure of the pilot air is greater than or equal to the predetermined value, the pilot check valve allows passage of the air flowing from the outlet port toward the inlet port.

3. The flow rate controller according to claim 1, wherein the third flow rate control valve includes:

a third throttle valve; and a check valve disposed in parallel with the third throttle valve, and configured to allow passage of the air flowing in a direction toward the pilot port, and prevent the air from flowing in a direction opposite thereto.

4. The flow rate controller according to claim 1, wherein the second flow rate control valve includes:

a second throttle valve; and a check valve disposed in parallel with the second throttle valve, and configured to allow passage of the air flowing in a direction toward the air cylinder, and prevent the air from flowing in a direction opposite thereto.

5. A drive device, comprising:

a high pressure air supply source configured to supply high pressure air to an air cylinder;

an exhaust port configured to discharge exhaust air from the air cylinder;

an operation switching valve configured to switch and connect one of the high pressure air supply source or the exhaust port to a port of the air cylinder; and a flow rate controller disposed between the operation switching valve and the port of the air cylinder, wherein the flow rate controller includes:

a first flow path connected between the operation switching valve and the air cylinder, and configured to supply and discharge air to and from a cylinder chamber of the air cylinder;

a first flow rate control valve disposed in the first flow path;

a second flow path disposed in parallel with the first flow path;

a pilot check valve disposed midway along the second flow path, and including an inlet port, an outlet port, and a pilot port, the inlet port being connected to a first portion of the second flow path on a side of the operation switching valve, and the outlet port being connected to a second portion of the second flow path on a side of the air cylinder;

a second flow rate control valve disposed midway along the second flow path, and connected in series with the pilot check valve;

a pilot air flow path one end of which communicates with the first flow path between the first flow rate control valve and the operation switching valve and with the second flow path between the second flow rate control valve and the operation switching valve and another end of which is connected to the pilot port of the pilot check valve; and a third flow rate control valve disposed in the pilot air flow path.

* * * * *